US009503950B2

(12) United States Patent
Krishnamurthy

(10) Patent No.: US 9,503,950 B2
(45) Date of Patent: Nov. 22, 2016

(54) MANAGING RESELECTION IN A MULTI-SIM DEVICE BY BLOCKING RESELECTION TO A FREQUENCY OF A SUBSCRIPTION THAT IS PRONE TO INTERFERENCE FROM TRANSMISSIONS OF ANOTHER SUBSCRIPTION

(71) Applicant: QUALCOMM Incorporated, San Diego, CA (US)

(72) Inventor: Saiprasad Krishnamurthy, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 72 days.

(21) Appl. No.: 14/596,254

(22) Filed: Jan. 14, 2015

(65) Prior Publication Data

US 2016/0205605 A1  Jul. 14, 2016

(51) Int. Cl.
| H04W 36/20 | (2009.01) |
| H04W 36/36 | (2009.01) |
| H04W 48/20 | (2009.01) |
| H04W 48/18 | (2009.01) |
| H04W 88/06 | (2009.01) |

(52) U.S. Cl.
CPC ............ *H04W 36/20* (2013.01); *H04W 36/36* (2013.01); *H04W 48/18* (2013.01); *H04W 48/20* (2013.01); *H04W 88/06* (2013.01)

(58) Field of Classification Search
CPC . H04W 72/082; H04W 36/20; H04W 36/36; H04W 88/06; H04B 17/318; H04B 17/345
See application file for complete search history.

(56) References Cited

U.S. PATENT DOCUMENTS

| 5,854,981 | A | * | 12/1998 | Wallstedt | .......... H04W 36/0083 455/436 |
| 7,292,549 | B2 | | 11/2007 | Saito | |
| 8,125,956 | B2 | | 2/2012 | Reddy et al. | |
| 8,675,581 | B2 | | 3/2014 | Chen et al. | |
| 8,706,115 | B2 | | 4/2014 | Pani et al. | |
| 8,805,303 | B2 | | 8/2014 | Koo et al. | |
| 9,119,173 | B1 | * | 8/2015 | Krishnamoorthy | ... H04W 68/02 |
| 2010/0130202 | A1 | | 5/2010 | Yu | |
| 2011/0117965 | A1 | * | 5/2011 | Gong | ................. H04W 48/18 455/558 |
| 2012/0207040 | A1 | | 8/2012 | Comsa et al. | |
| 2013/0012135 | A1 | * | 1/2013 | Ruohonen | ............ H04B 1/406 455/63.1 |
| 2013/0176885 | A1 | | 7/2013 | Lee et al. | |
| 2013/0242833 | A1 | | 9/2013 | Ahn et al. | |
| 2014/0106750 | A1 | * | 4/2014 | Roullier | ............... H04W 48/20 455/436 |
| 2014/0314008 | A1 | | 10/2014 | Lee et al. | |
| 2014/0342728 | A1 | * | 11/2014 | Dhanda | ................ H04W 48/16 455/422.1 |
| 2016/0021660 | A1 | * | 1/2016 | Krishnamurthy | . H04W 72/0453 455/452.1 |
| 2016/0050590 | A1 | * | 2/2016 | Ponukumati | ........ H04B 17/309 455/437 |

OTHER PUBLICATIONS

International Search Report and Written Opinion—PCT/US2015/064902 ISA/EPO—Mar. 29, 2016.

* cited by examiner

*Primary Examiner* — Bobbak Safaipour
(74) *Attorney, Agent, or Firm* — The Marbury Law Group, PLLC

(57) ABSTRACT

Various embodiments provide methods, devices, and non-transitory processor-readable storage media for reducing interference between subscriptions during cell reselection. Various embodiments enable blocking cell reselection by a subscription to a neighbor cell that may be prone to interference by the radio frequency (RF) resources of another subscription on a mobile communication device (e.g., a multi-active communication device).

28 Claims, 8 Drawing Sheets

MANAGING RESELECTION IN A MULTI-SIM DEVICE BY BLOCKING RESELECTION TO A FREQUENCY OF A SUBSCRIPTION THAT IS PRONE TO INTERFERENCE FROM TRANSMISSIONS OF ANOTHER SUBSCRIPTION

BACKGROUND

Some new designs of mobile communication devices—such as smart phones, tablet computers, and laptop computers—include two or more Subscriber Identity Module ("SIM") cards that provide users with access to multiple separate mobile telephony networks. Examples of mobile telephony networks include GSM, TD-SCDMA, CDMA2000, LTE, and WCDMA. Example multi-SIM mobile communication devices include mobile phones, laptop computers, smart phones, and other mobile communication devices that are configured to connect to multiple mobile telephony networks. A mobile communication device that includes a plurality of SIMs and connects to two or more separate mobile telephony networks using two or more separate radio-frequency ("RF") transceivers is termed a "multi-SIM-multi-active," "multi-subscription-capable," "multi-active," or "MSMA" communication device. An example MSMA communication device is a "dual-SIM-dual-active" or "DSDA" communication device, which includes two SIM cards/subscriptions associated with two mobile telephony networks.

Because a multi-active communication device has a plurality of separate RF communication circuits or "RF resources," each subscription on the multi-active communication device may use that subscription's associated RF resource to communicate with that subscription's mobile network at any time. However, in certain band/frequency combinations of different technologies in a multi-active communication device, the transmission ("Tx") on one RF resource introduces band noise or inter-modulation on the other RF resource's reception ("Rx") (i.e., interference). As a result, the transmission of one technology leads to errors (e.g., de-sensing) in the RF samples on the other technology's subscription. This interference of the two RF resources may be minimal when one of the subscriptions is using a time division duplex (TDD) technology (e.g., TD-SCDMA) and the measurements of the other subscription were made during a time when the Tx of the TDD technology was not occurring. However, following a reselection event by one of the RF resources, reception will be continuous for subscriptions using a frequency division duplex (FDD) technology (e.g., GSM) and discontinuous but frequent for TDD technologies, thus causing constant degradation in such situations.

SUMMARY

Various embodiments provide methods, devices, and non-transitory processor-readable storage media for reducing interference between subscriptions during cell reselection. Various embodiments enable blocking cell reselection by a subscription to a neighbor cell that may be prone to interference by the radio frequency (RF) resources of another subscription on a mobile communication device (e.g., a multi-active communication device).

Methods according to the various embodiments may include performing neighbor cell measurements for each neighbor cell in a neighbor cell list of a first subscription in response to meeting a reselection criteria for the first subscription, determining whether a second subscription is operating on the multi-active communication device, querying a frequency information data table stored in a memory of the multi-active communication device to retrieve frequency information of the second subscription in response to determining that the second subscription is operating on the multi-active communication device, and determining an interference estimate for each neighbor cell on the neighbor cell list based on the frequency information of the second subscription. In some embodiments, determining an interference estimate for each neighbor cell on the neighbor cell list based on the frequency information of the second subscription may include determining whether a frequency of a selected neighbor cell overlaps a frequency of the second subscription based on the frequency information of the second subscription, aligning frames of the first subscription and frames of the second subscription to a common time in response to determining that the frequency of the selected neighbor cell overlaps a frequency of the second subscription, determining whether one or more slots of the frames of the first subscription are impacted by transmissions of the second subscription based on the alignment of the frames of the first subscription and the frames of the second subscription to the common time, determining a time of disruption of reception estimate for the neighbor cell based on a number of slots of the frames of the first subscription impacted by transmissions of the second subscription in response to determining that one or more slots of the frames of the first subscription are impacted by transmissions of the second subscription, setting the interference estimate for the selected neighbor cell to the determined time of disruption of reception estimate in response to determining that one or more slots of the frames of the first subscription are impacted by transmissions of the second subscription, and setting the interference estimate for the selected neighbor cell to zero in response to determining that the frequency of the selected neighbor cell does not overlap a frequency of the second subscription or in response to determining that no slots of the frames of the first subscription are impacted by transmissions of the second subscription.

In some embodiments, the methods may further include sorting the neighbor cell list based on the interference estimate for each neighbor cell. In some embodiments, the methods may further include removing neighbor cells with interference estimates above a degradation threshold to generate a revised neighbor cell list, sorting the revised neighbor cell list based on a signal strength of each neighbor cell, and conducting reselection for the first subscription using the revised neighbor cell list sorted based on the signal strength of each neighbor cell. In some embodiments, the degradation threshold may be a maximum interference time per frame for the first subscription.

In some embodiments, the methods may further include determining a priority for each neighbor cell on the neighbor cell list, sorting the neighbor cell list based on the determined priority for each neighbor cell, and conducting reselection for the first subscription using the neighbor cell list sorted based on the determined priority for each neighbor cell. In some embodiments, the determined priority may be based at least in part on the signal strength of and the interference estimate for that neighbor cell.

In some embodiments, the methods may further include receiving frequency information from each subscription operating on the multi-active communication device, and generating the frequency information data table based on the received frequency information from each subscription. In some embodiments, the frequency information may be one or more of a technology type indication, frequency indication, timing indication, and data rate indication. In some embodiments, each subscription operating on the multi-active communication device may be configured to send that subscription's frequency information in response to a change in subscription parameters or a request for frequency information.

In some embodiments, the methods may further include sorting the neighbor cell list based on a signal strength of each neighbor cell. In some embodiments, the methods may further include conducting reselection for the first subscription using the neighbor cell list sorted based on the signal strength of each neighbor cell in response to determining that a second subscription is not operating on the multi-active communication device.

In some embodiments, the methods may further include determining whether a reselection criteria has been met for the first subscription. In some embodiments, the reselection criteria may be a serving cell quality measurement falling below a quality threshold.

Various embodiments may include a multi-active communication device configured with processor-executable instructions to perform operations of the methods described above.

Various embodiments may include a multi-active communication device having means for performing functions of the operations of the methods described above.

Various embodiments may include non-transitory processor-readable media on which are stored processor-executable instructions configured to cause a processor of multi-active communication device to perform operations of the methods described above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
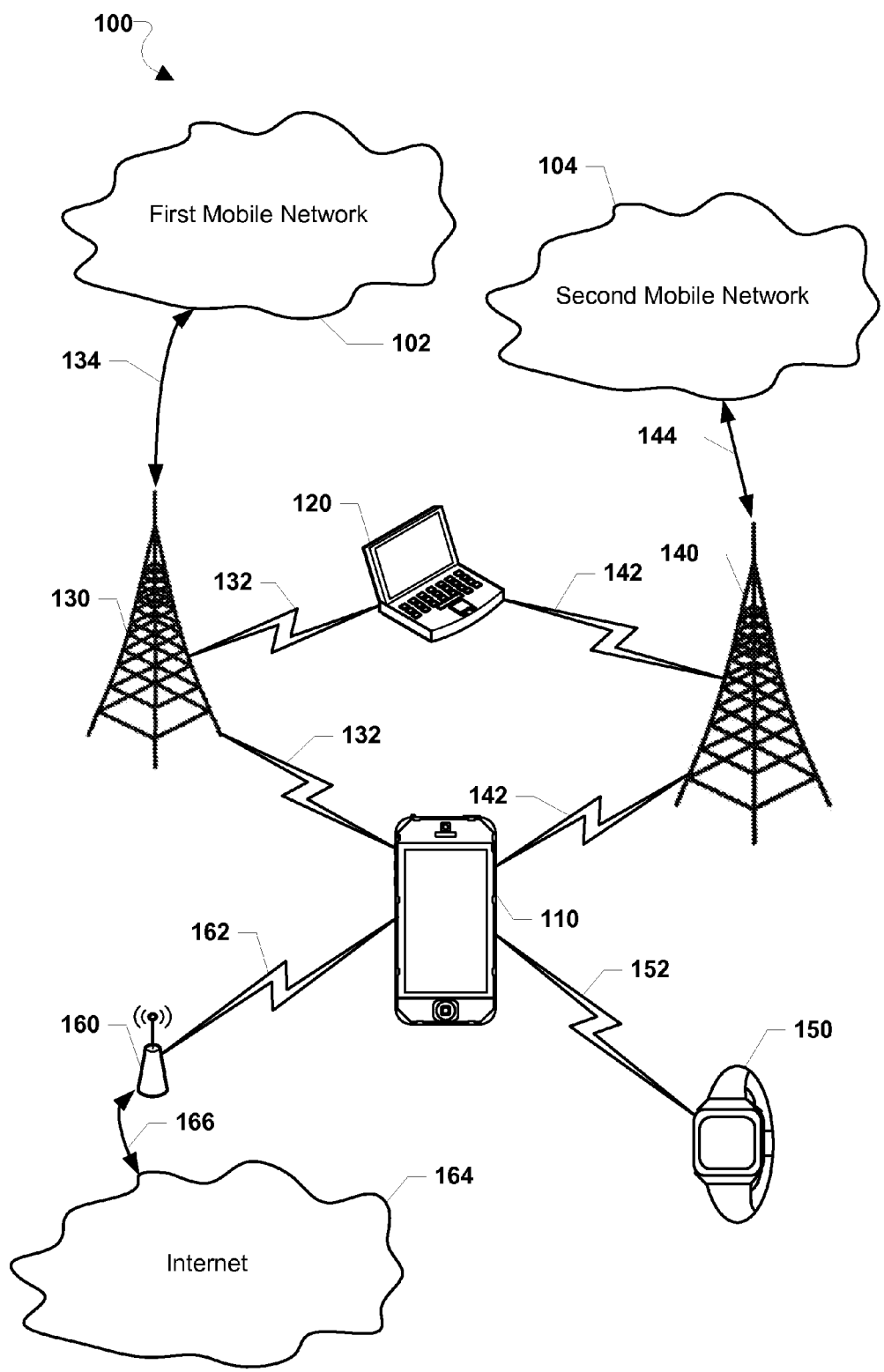
FIG. 1 is a communication system block diagram of mobile telephony networks suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the terms "multi-SIM-multi-active communication device," "multi-subscriber-multi-active communication device," and "mobile communication device" are used interchangeably and refer to any one or all of cellular telephones, smart phones, personal or mobile multi-media players, personal data assistants, laptop computers, personal computers, tablet computers, smart books, palm-top computers, wireless electronic mail receivers, multimedia Internet-enabled cellular telephones, wireless gaming controllers, and similar personal electronic devices that include a programmable processor, memory, and circuitry for connecting to at least two mobile communication networks. The various aspects may be useful in mobile communication devices, such as smart phones, and so such devices are referred to in the descriptions of various embodiments. However, the embodiments may be useful in any electronic devices, such as a dual-SIM-dual-active communication device, that may individually maintain a plurality of subscriptions that may simultaneously utilize a plurality of separate RF resources.

As used herein, the terms "SIM," "SIM card," and "subscriber identification module" are used interchangeably to refer to a memory that may be an integrated circuit or embedded into a removable card, and that stores an International Mobile Subscriber Identity (IMSI), related key, and/or other information used to identify and/or authenticate a wireless device on a network and enable a communication service with the network. Because the information stored in a SIM enables the wireless device to establish a communication link for a particular communication service with a particular network, the term "subscription" is also used herein as a shorthand reference to the communication service associated with and enabled by the information stored in a particular SIM as the SIM and the communication network, as well as the services and subscriptions supported by that network, correlate to one another.

As described, because a multi-active communication device has a plurality of separate RF resources/radios, each subscription on the multi-active communication device may use that subscription's associated RF resource to communicate with that subscription's mobile network at any time. As a result, in certain frequency-band combinations of operation, the simultaneous use of the RF resources may cause one or more RF resources to desensitize or interfere with the ability of the other RF resources to operate normally because of the proximity of the antennas of the RF chains included in the multi-active communication device.

For example, a multi-active communication device may suffer from intra-device interference when a first subscription is attempting transmission (Tx) while a second subscription in the multi-active communication device is simultaneously attempting reception (Rx). During such a "coexistence event," the first subscription's transmissions may impair the second subscription's ability to receive transmissions. This interference may be in the form of blocking interference, harmonics, inter-modulation, band noise, and other noises and distortion received by the second subscription. Such interference by the transmissions of the first subscription may lead to errors in the RF samples on the second subscription's RF resources.

This interference of the two RF resources may be minimal when one of the subscriptions is using a time division duplex (TDD) technology (e.g., TD-SCDMA) and the measurements of the other subscription were made during a time when the Tx of the TDD technology was not occurring. However, following a reselection event by one of the RF resources, reception will be continuous for subscriptions using a frequency division duplex (FDD) technology (e.g., GSM) and discontinuous but frequent for TDD technologies, thus causing constant degradation in such situations— especially when the transmitting subscription's technology does not support frequency hopping on the uplink.

Currently, when a reselection criteria (e.g., a serving cell quality measurement falling below a quality threshold) is met for a subscription of a multi-active communication device, the multi-active communication device may perform neighbor cell measurements (e.g., intra-frequency measurements, inter-frequency measurements, inter-RAT measurements, etc.) on the neighbor cells listed in the neighbor cell list for the reselecting subscription as part of a cell reselection process, such as the reselection process specified in the 3GPP UMTS standard. The neighbor cell list may be sorted based on the measured signal strength of each neighbor cell on the neighbor cell list. This neighbor cell list sorted based on signal strength is then used to conduct reselection to a new cell, and the subscription generally completes reselection by transitioning to the neighbor cell with the strongest signal strength.

While the current reselection processes may result in the neighbor cell with the strongest signal strength being selected, signal strength may not account for intra-device interference experienced when one subscription is attempting Tx while another subscription is simultaneously attempting Rx. Thus, even though the signal strength may be strong, the selected neighbor cell may be prone to interference with another subscription, and significant interference caused by another subscription may cause service interruptions and dropped calls for the reselecting subscription.

To overcome this, various embodiments implemented on a mobile communication device (e.g., a multi-active communication device) provide methods for reducing interference between subscriptions during cell reselection. The various embodiments provide methods for blocking cell reselection by a subscription to a neighbor cell that may be prone to interference by the RF resources of another subscription on the mobile communication device (e.g., a multi-active communication device).

Figure 4:
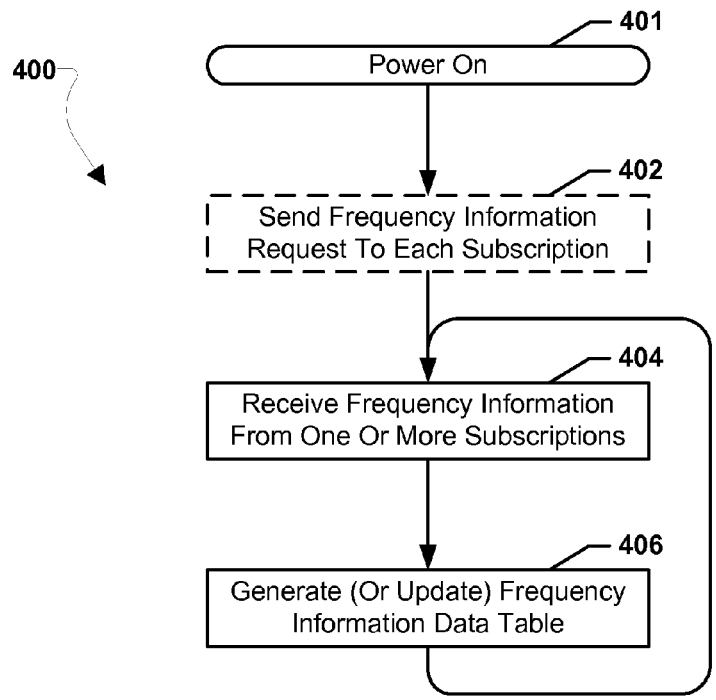
FIG. 4 is a process flow diagram illustrating a method for generating a device frequency information data table for subscriptions operating on a multi-active communication device according to various embodiments.

In various embodiments, a processor of a mobile communication device (e.g., a multi-active communication device) may maintain (e.g., generate and/or update) a frequency information data table including information regarding the subscriptions operating on the mobile communication device and the RF resources of those subscriptions (see e.g., FIG. 4). In various embodiments, information in the frequency information data table may include information describing the operation of the RF resources used by a subscription, such as technology type indications (e.g., WCDMA FDD, GSM/GPRS TDD, LTE FDD/TDD, TD-SCDMA TDD, CDMA 1x/DO FDD, etc.), frequency indications (e.g., frequency list, frequency ranges, etc.), timing indications (e.g., time between bursts, number of bursts, frequency hopping patterns, frame attributes, slot attributes, transmission durations, etc.), and/or data rate indications (e.g., high, low, etc.). In various embodiments, each subscription may provide that subscription's own information to the processor of a mobile communication device (e.g., a multi-active communication device) upon power up, as changes to the subscription's parameters occur (e.g., upon a change in frequency, etc.), and/or as requested (see e.g., FIG. 5).

In various embodiments, a processor of a mobile communication device (e.g., a multi-active communication device) may determine whether a reselection criteria (e.g., a serving cell quality measurement falling below a quality threshold) is met for a first subscription operating on the mobile communication device. In response to determining the reselection criteria is met, the mobile communication device (e.g., a multi-active communication device) may perform neighbor cell measurements (e.g., intra-frequency measurements, inter-frequency measurements, inter-RAT measurements, etc.) of neighbor cells listed on the neighbor cell list of the reselecting subscription as part of a cell reselection process. The neighbor cell list may be sorted based on relative measured signal strength of the neighbor cells on the neighbor cell list. The processor of the mobile communication device (e.g., a multi-active communication device) may determine whether other subscriptions are operating on the mobile communication device, and may query the frequency information data table to retrieve frequency information of any other subscriptions operating on the mobile communication device (see e.g., FIGS. 6 and 7).

Figure 6:
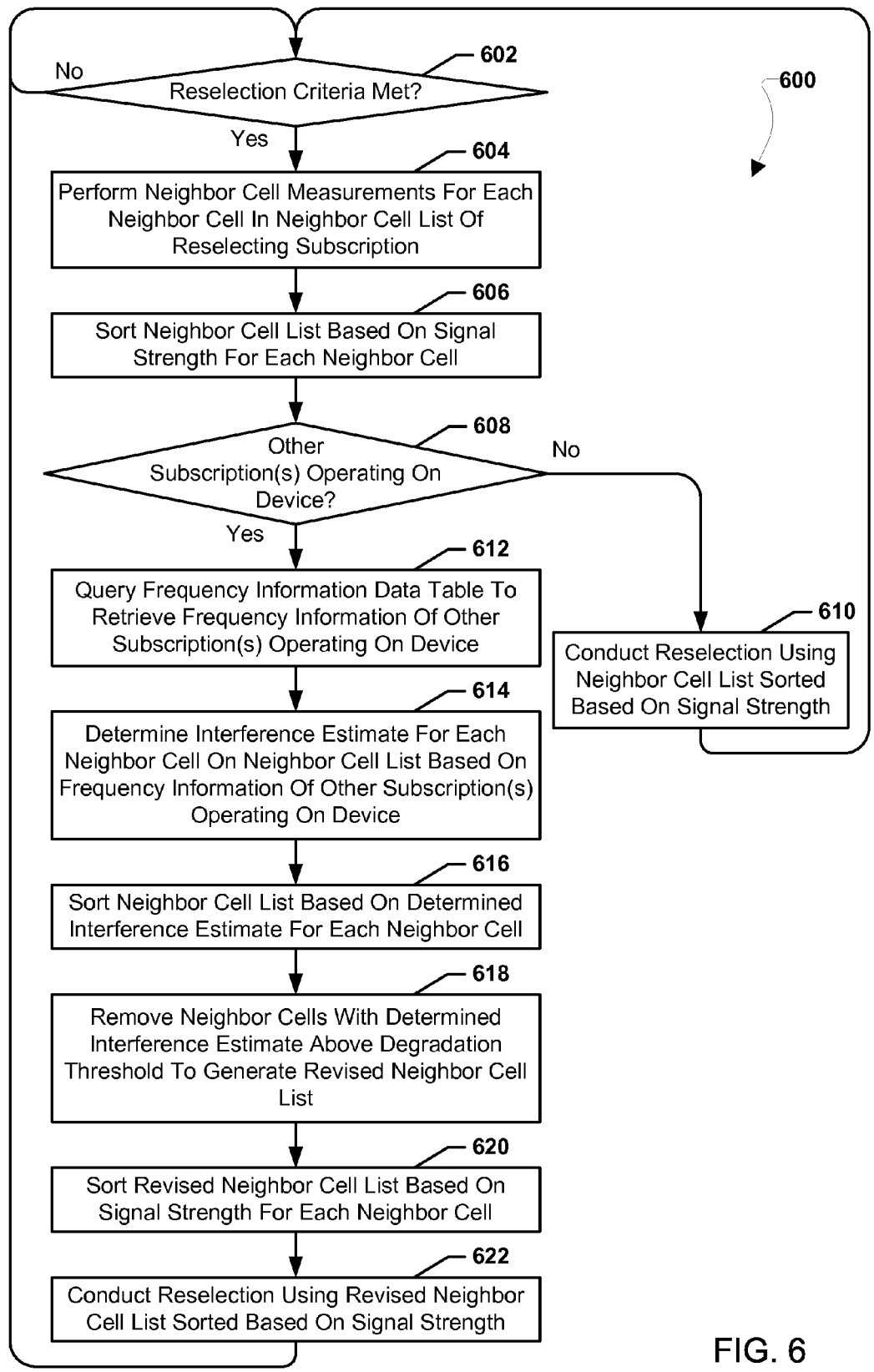
FIG. 6 is a process flow diagram illustrating a method for blocking reselection of a first subscription on a multi-active communication device to neighbor cells prone to interference by a second subscription on the multi-active communication device according to various embodiments.
Figure 7:
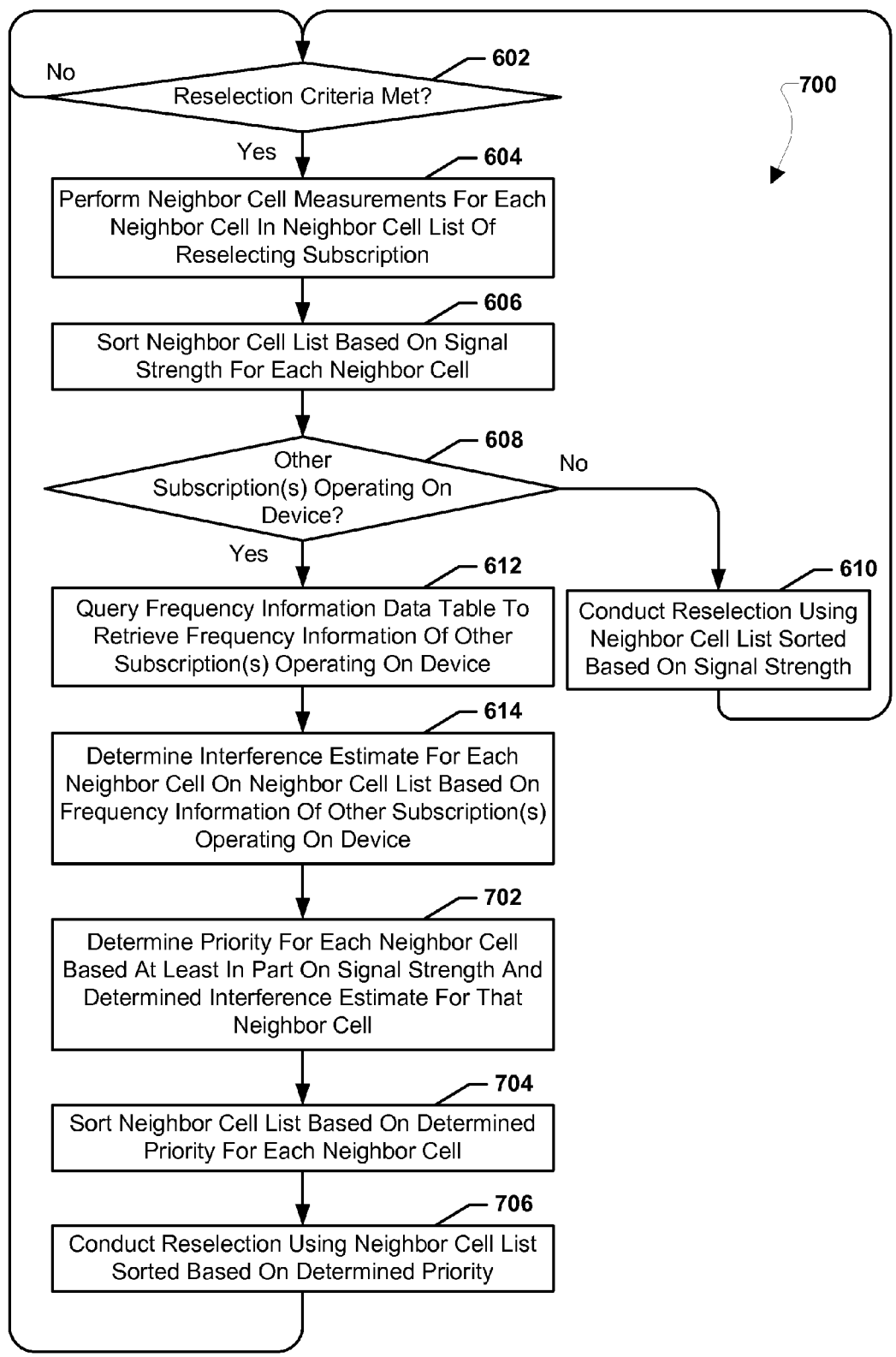
FIG. 7 is a process flow diagram illustrating a method for blocking reselection of a first subscription on a multi-active communication device to neighbor cells prone to interference by a second subscription on the multi-active communication device according to various embodiments.

In various embodiments, the processor of the mobile communication device (e.g., a multi-active communication device) may determine interference estimates for each neighbor cell on the neighbor cell list based on frequency information of the other subscriptions operating on the mobile communication device retrieved from the frequency information data table (see e.g., FIGS. 6 and 7). For example, an interference estimate for each neighbor cell in a neighbor cell list of a WCDMA subscription may be determined based on the frequency ranges and frequency hopping pattern for a GSM subscription indicated in the frequency information data table. The interference estimates may be based on an amount of interference and a periodicity of the interference. The amount and periodicity of interference may be functions of various factors, including the frequency hopping patterns of the subscriptions. In various embodiments, the interference estimates may be determined based at least in part upon aligning the frames of the subscriptions to a common time and determining a time of disruption of reception estimate for a selected neighbor cell based on a number of slots of frames of the reselecting subscription that may be impacted by transmissions on other subscriptions (see e.g., FIG. 8). In various embodiments, a time of disruption to reception estimate may be an estimate of any disruption to the reception on one subscription's RF resources due to transmission on another subscription's RF resources. In various embodiments, the interference estimates may be low, such as zero, for neighbor cells that do not overlap frequencies with other subscriptions and higher, such as values 1-10, based on an amount of interference and a periodicity of the interference. In various embodiments, the interference estimates may be representations of an estimate of the percentage of time per frame that the reselecting subscription may experience interference from another subscription.

In various embodiments, the processor of the mobile communication device (e.g., a multi-active communication device) may sort the neighbor cell list based on the determined interference estimates and neighbor cells with interference estimates above a degradation threshold may be removed from the neighbor cell list. The degradation threshold may be a value representing a maximum amount of interference that may be acceptable on a reselected cell. For example, the degradation threshold may be a value corresponding to a maximum interference time, such as a maximum percentage of time per frame that the reselecting subscription may experience interference from another subscription above which reselection may impact service for the reselecting subscription. The revised neighbor cell list of neighbor cells with interference estimates at or below the degradation threshold may be sorted again based on signal strength and used by the mobile communication device (e.g., a multi-active communication device) to conduct reselection (see e.g., FIG. 6). In this manner, the mobile communication device (e.g., a multi-active communication device) may be prevented from reselecting to a neighbor cell that may experience significant interference because those neighbor cells may not be made available on the neighbor cell list.

In various embodiments, the processor of the mobile communication device (e.g., a multi-active communication device) may determine a priority for each neighbor cell based at least in part on signal strength and an interference estimate for that respective neighbor cell. For example, signal strength and interference may be inputs to a weighted non-linear equation used to determine a priority value. The processor of the mobile communication device (e.g., a multi-active communication device) may sort the neighbor cell list based on the determined priorities and the mobile communication device may use the neighbor cell list sorted based on the priorities to conduct reselection (see e.g., FIG. 7).

The various embodiments may improve mobile communication device (e.g., a multi-active communication device) performance following reselection by blocking reselection to neighbor cells that may be prone to significant and continual interference from the ongoing transmission by the other subscriptions of the mobile communication device. For example, the reselection rate may be reduced for the mobile communication device because neighbor cells with potential interference are avoided for reselection. Additionally, a reduction in the reselection rate may reduce the power consumption of the mobile communication device (e.g., a multi-active communication device) because the power used in reselection over time may be reduced.

Various embodiments may be implemented within a variety of communication systems 100 that include at least two mobile telephony networks, an example of which is illustrated in FIG. 1. A first mobile network 102 and a second mobile network 104 typically each include a plurality of cellular base stations (e.g., a first base station 130 and a second base station 140). A first mobile communication device 110 may be in communication with the first mobile network 102 through a cellular connection 132 to the first base station 130. The first mobile communication device 110 may also be in communication with the second mobile network 104 through a cellular connection 142 to the second base station 140. The first base station 130 may be in communication with the first mobile network 102 over a wired connection 134. The second base station 140 may be in communication with the second mobile network 104 over a wired connection 144.

A second mobile communication device 120 may similarly communicate with the first mobile network 102 through the cellular connection 132 to the first base station 130. The second mobile communication device 120 may communicate with the second mobile network 104 through the cellular connection 142 to the second base station 140. The cellular connections 132 and 142 may be made through two-way wireless communication links, such as 4G, 3G, LTE, CDMA, TDMA, WCDMA, GSM, GPRS, TD-SCDMA, CDMA 1x/DO, and other mobile telephony communication technologies.

While the mobile communication devices 110, 120 are shown connected to the mobile networks 102, 104, in some embodiments (not shown), the mobile communication devices 110, 120 may include one or more subscriptions to two or more mobile networks 102, 104 and may connect to those networks in a manner similar to operations described above.

In some embodiments, the first mobile communication device 110 may establish a wireless connection 152 with a peripheral device 150 used in connection with the first mobile communication device 110. For example, the first mobile communication device 110 may communicate over a Bluetooth® link with a Bluetooth-enabled personal computing device (e.g., a "smart watch"). In some embodiments, the first mobile communication device 110 may establish a wireless connection 162 with a wireless access point 160, such as over a Wi-Fi connection. The wireless access point 160 may be configured to connect to the Internet 164 or another network over a wired connection 166.

While not illustrated, the second mobile communication device 120 may similarly be configured to connect with the peripheral device 150 and/or the wireless access point 160 over wireless links.

Figure 2:
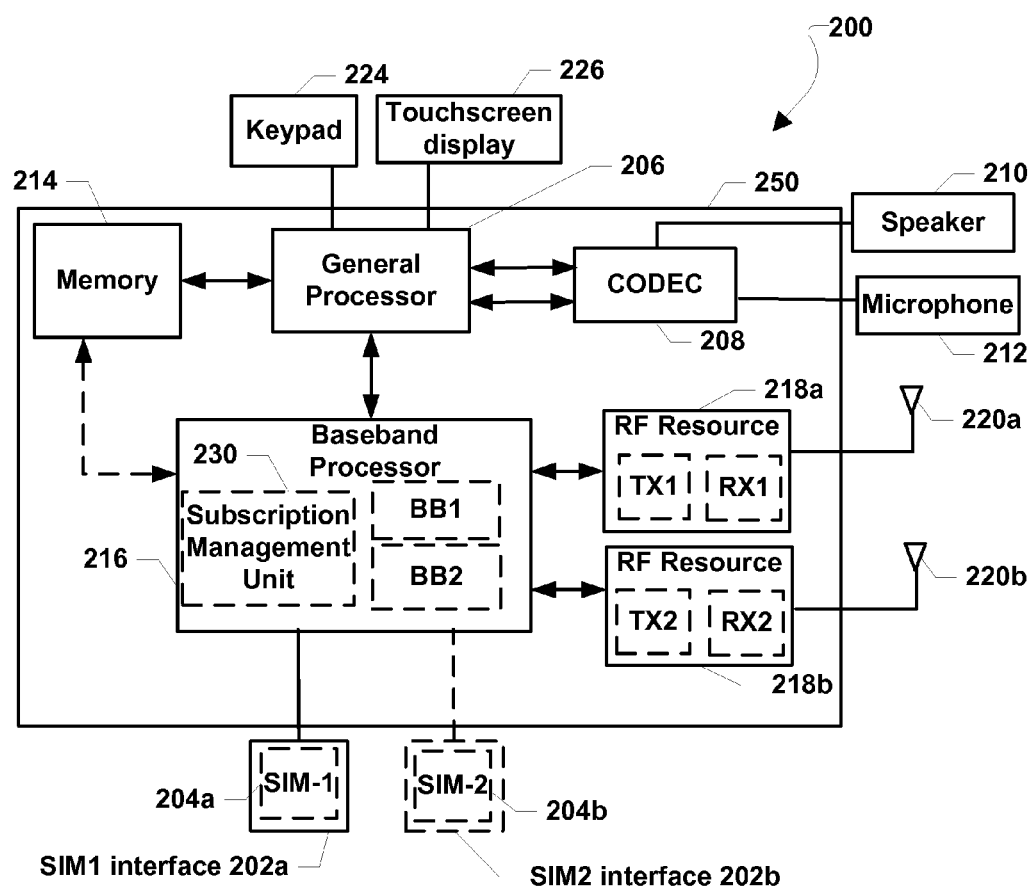
FIG. 2 is a component block diagram of a multi-active communication device according to various embodiments.

FIG. 2 is a functional block diagram of a mobile communication device 200 suitable for implementing various embodiments. According to various embodiments, the mobile communication device 200 may be similar to one or more of the mobile communication devices 110, 120 as described with reference to FIG. 1. With reference to FIGS. 1-2, the mobile communication device 200 may include a first SIM interface 202a, which may receive a first identity module SIM-1 204a that is associated with a first subscription. The mobile communication device 200 may also include a second SIM interface 202b, which may receive a second identity module SIM-2 204b that is associated with a second subscription.

A SIM in various embodiments may be a Universal Integrated Circuit Card (UICC) that is configured with SIM and/or USIM applications, enabling access to, for example, GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card. Each SIM card may have a CPU, ROM, RAM, EEPROM, and I/O circuits.

A SIM used in various embodiments may contain user account information, an international mobile subscriber identity (IMSI), a set of SIM application toolkit (SAT) commands, and storage space for phone book contacts. A SIM card may further store home identifiers (e.g., a System Identification Number (SID)/Network Identification Number (NID) pair, a Home PLMN (HPLMN) code, etc.) to indicate the SIM card network operator provider. An Integrated Circuit Card Identity (ICCID) SIM serial number is printed on the SIM card for identification. However, a SIM may be implemented within a portion of memory of the mobile communication device 200 (e.g., a memory 214), and thus need not be a separate or removable circuit, chip or card.

The mobile communication device 200 may include at least one controller, such as a general processor 206, which may be coupled to a coder/decoder (CODEC) 208. The CODEC 208 may in turn be coupled to a speaker 210 and a microphone 212. The general processor 206 may also be coupled to the memory 214. The memory 214 may be a non-transitory computer readable storage medium that stores processor-executable instructions. For example, the instructions may include routing communication data relating to the first or second subscription though a corresponding baseband-RF resource chain.

The memory 214 may store an operating system (OS), as well as user application software and executable instructions. The memory 214 may also store application data, such as an array data structure.

The general processor 206 and the memory 214 may each be coupled to at least one baseband modem processor 216. Each SIM in the mobile communication device 200 (e.g., the SIM-1 204a and the SIM-2 204b) may be associated with a baseband-RF resource chain. A baseband-RF resource chain may include the baseband modem processor 216, which may perform baseband/modem functions for communicating with/controlling a RAT, and may include one or more amplifiers and radios, referred to generally herein as RF resources (e.g., RF resources 218a, 218b). In some embodiments, baseband-RF resource chains may share the baseband modem processor 216 (i.e., a single device that performs baseband/modem functions for all SIMs on the mobile communication device 200). In other embodiments, each baseband-RF resource chain may include physically or logically separate baseband processors (e.g., BB1, BB2).

In some embodiments, the RF resources 218a, 218b may be associated with different subscriptions. For example, a first subscription (e.g., a subscription to a GSM network) may be associated with the RF resource 218a, and a second subscription (e.g., a subscription to a CDMA or a WCDMA network) may be associated with the RF resource 218b. The RF resources 218a, 218b may each be transceivers that perform transmit/receive functions on behalf of their respective subscriptions. The RF resources 218a, 218b may also include separate transmit and receive circuitry, or may include a transceiver that combines transmitter and receiver functions. The RF resources 218a, 218b may each be coupled to a wireless antenna (e.g., a first wireless antenna 220a or a second wireless antenna 220b). The RF resources 218a, 218b may also be coupled to the baseband modem processor 216.

In some embodiments, the general processor 206, the memory 214, the baseband processor(s) 216, and the RF resources 218a, 218b may be included in the mobile communication device 200 as a system-on-chip 250. In some embodiments, the first and second SIMs 204a, 204b and their corresponding interfaces 202a, 202b may be external to the system-on-chip 250. Further, various input and output devices may be coupled to components on the system-on-chip 250, such as interfaces or controllers. Example user input components suitable for use in the mobile communication device 200 may include, but are not limited to, a keypad 224, a touchscreen display 226, and the microphone 212.

In some embodiments, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive a selection of a contact from a contact list or receive a telephone number. As another example, the request to initiate the outgoing call may be in the form of a voice command received via the microphone 212. Interfaces may be provided between the various software modules and functions in the mobile communication device 200 to enable communication between them, as is known in the art.

Functioning together, the two SIMs 204a, 204b, the baseband modem processor 216, the RF resources 218a, 218b, and the wireless antennas 220a, 220b may constitute two or more radio access technologies (RATs). For example, a SIM, baseband processor, and RF resource may be configured to support two different RATs, such as GSM and WCDMA. More RATs may be supported on the mobile communication device 200 by adding more SIM cards, SIM interfaces, RF resources, and/or antennae for connecting to additional mobile networks.

The mobile communication device 200 may include a subscription management unit 230 configured to maintain (e.g., generate and/or update) a frequency information data table and/or manage neighbor cell list for one or more subscriptions on the mobile communication device 200. In some embodiment, the subscription management unit 230 may be implemented in the baseband modem processor 216. In some embodiments, the subscription management unit 230 may be implemented within the general processor 206. In some embodiments, the subscription management unit 230 may be implemented as a separate hardware component (i.e., separate from the general processor 206). In some embodiments, the subscription management unit 230 may be implemented as a software application stored within the memory 214 and executed by the general processor 206. The subscription management unit 230 may maintain (e.g., generate and/or update) frequency information data tables, sort neighbor cell list for one or more subscriptions on the mobile communication device, and/or remove neighbor cells from neighbor cell lists as described in the disclosure.

Figure 3:
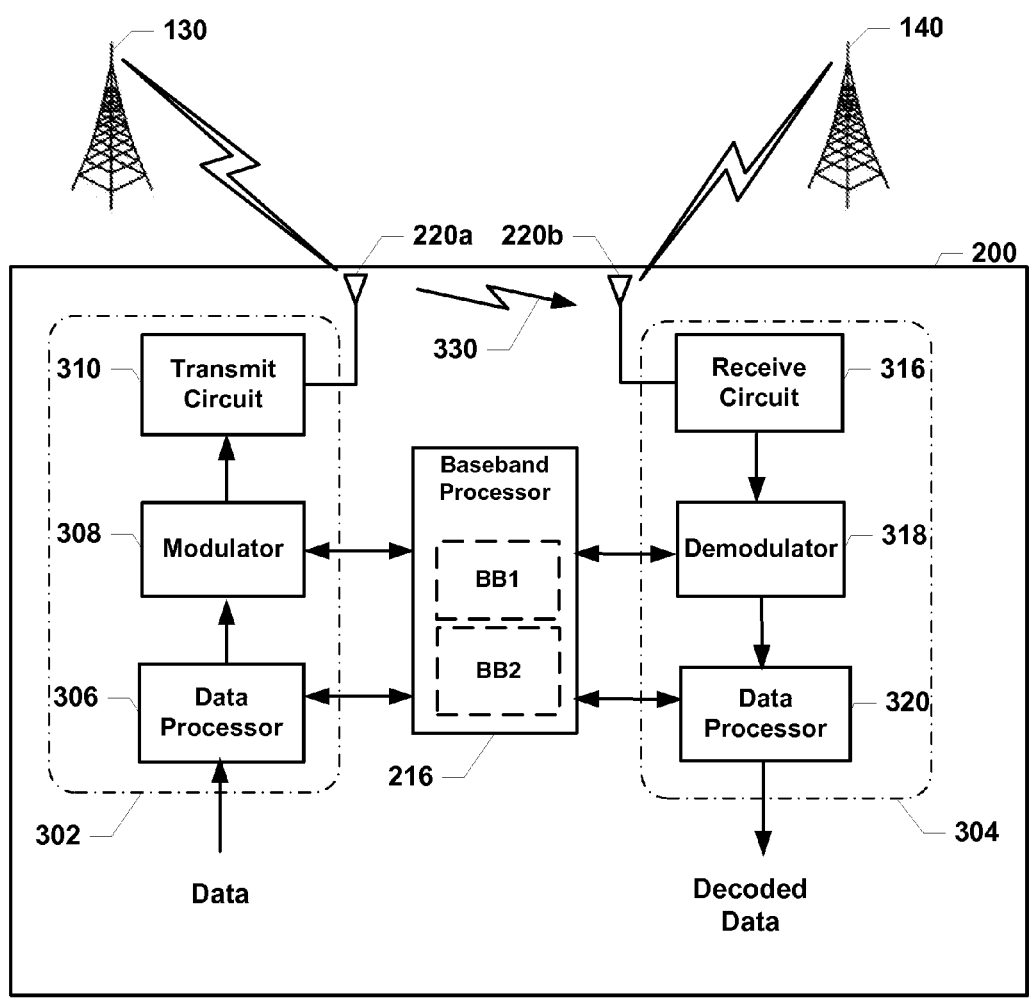
FIG. 3 is a component block diagram illustrating the interaction between components of different transmit/receive chains in a multi-active communication device according to various embodiments.

FIG. 3 is a block diagram of transmit and receive components in separate RF resources on the mobile communication device 200 described above with reference to FIGS. 1-2, according to various embodiments. With reference to FIGS. 1-3, a transmitter 302 may be part of the RF resource 218a, and a receiver 304 may be part of the RF resource 218b. In some embodiments, the transmitter 302 may include a data processor 306 that may format, encode, and interleave data to be transmitted. The transmitter 302 may include a modulator 308 that modulates a carrier signal with encoded data, such as by performing Gaussian minimum shift keying (GMSK). One or more transmit circuits 310 may condition the modulated signal (e.g., by filtering, amplifying, and upconverting) to generate an RF modulated signal for transmission. The RF modulated signal may be transmitted to the first base station 130 via the first wireless antenna 220a, for example.

At the receiver 304, the second wireless antenna 220b may receive RF modulated signals from the second base station 140 on the second wireless antenna 220b. However, the second wireless antenna 220b may also receive some RF signaling 330 from the transmitter 302, which may ultimately compete with the desired signal received from the second base station 140. One or more receive circuits 316 may condition (e.g., filter, amplify, and downconvert) the received RF modulated signal, digitize the conditioned signal, and provide samples to a demodulator 318. The demodulator 318 may extract the original information-bearing signal from the modulated carrier wave, and may provide the demodulated signal to a data processor 320. The data processor 320 may de-interleave and decode the signal to obtain the original, decoded data, and may provide decoded data to other components in the mobile communication device 200. Operations of the transmitter 302 and the receiver 304 may be controlled by a processor, such as the baseband modem processor 216. In various embodiments, each of the transmitter 302 and the receiver 304 may be implemented as circuitry that may be separated from their corresponding receive and transmit circuitries (not shown). Alternatively, the transmitter 302 and the receiver 304 may be respectively combined with corresponding receive circuitry and transmit circuitry, for example, as transceivers associated with the SIM-1 204a and the SIM-2 204b.

Receiver de-sense may occur when transmissions by a first subscription on the uplink (e.g., the RF signaling 330) interferes with receive activity on a different transmit/receive chain associated with a second subscription. The signals received by the second subscription may become corrupted and difficult or impossible to decode as a result of the de-sense or interference. Further, noise from the transmitter 302 may be detected by a power monitor (not shown) that measures the signal strength of surrounding cells, which may cause the mobile communication device 200 to falsely determine the presence of a nearby cell site.

Because inter-device coexistence interference may severely degrade the performance of subscriptions affected by such interference, various embodiments reduce interference between subscriptions during cell reselection by blocking cell reselection to a neighbor cell that may be prone to interference by the RF resources of another subscription on the mobile communication device (e.g., a multi-active communication device).

FIG. 4 illustrates a method 400 for generating or updating a device frequency information data table for subscriptions operating on a mobile communication device (e.g., a multi-active communication device). The method 400 may be implemented with a processor (e.g., the general processor 206 of FIG. 2, the baseband modem processor 216, the subscription management unit 230, a separate controller, and/or the like) of a multi-active communication device (e.g., the mobile communication devices 110, 120, 200 described with reference to FIGS. 1-3). For example, the operations of method 400 may be implemented by or within a subscription management unit of a baseband processor (e.g., subscription management unit 230 and baseband processor 216 of FIG. 2). With reference to FIGS. 1-4, the device processor may begin performing operations of method 400 in response to the multi-active communication device's powering on in block 401.

In optional block 402, the device processor may send a frequency information request to each subscription. The frequency information request may be a message sent to each subscription operating on the multi-active communication device requesting each subscription provide that subscription's respective frequency information. Frequency information may include information describing the operation of the RF resources used by a subscription, such as technology type indications (e.g., WCDMA FDD, GSM/GPRS TDD, LTE FDD/TDD, TD-SCDMA TDD, CDMA 1x/DO FDD, etc.), frequency indications (e.g., frequency list, frequency ranges, etc.), timing indications (e.g., time between bursts, number of bursts, frequency hopping patterns, frame attributes, slot attributes, transmission durations, etc.), and/or data rate indications (e.g., high, low, etc.).

In block 404, the device processor may receive frequency information from one or more subscriptions. Frequency information may be provided by subscriptions in response to various conditions, such as upon powering on of the multi-active communication device, upon a change in a subscription's parameters, in response to a received frequency information request, insertion of a SIM card, etc. In block 406, the device processor may generate or update a frequency information data table stored in a memory of the multi-active communication device based on the received frequency information. The frequency information data table may store frequency information for all the subscriptions operating on the multi-active communication device.

After generating or updating the frequency information data table in block 406, the device processor may perform the operations of the method 400 in a loop by receiving additional frequency information from one or more subscriptions in block 404.

Figure 5:
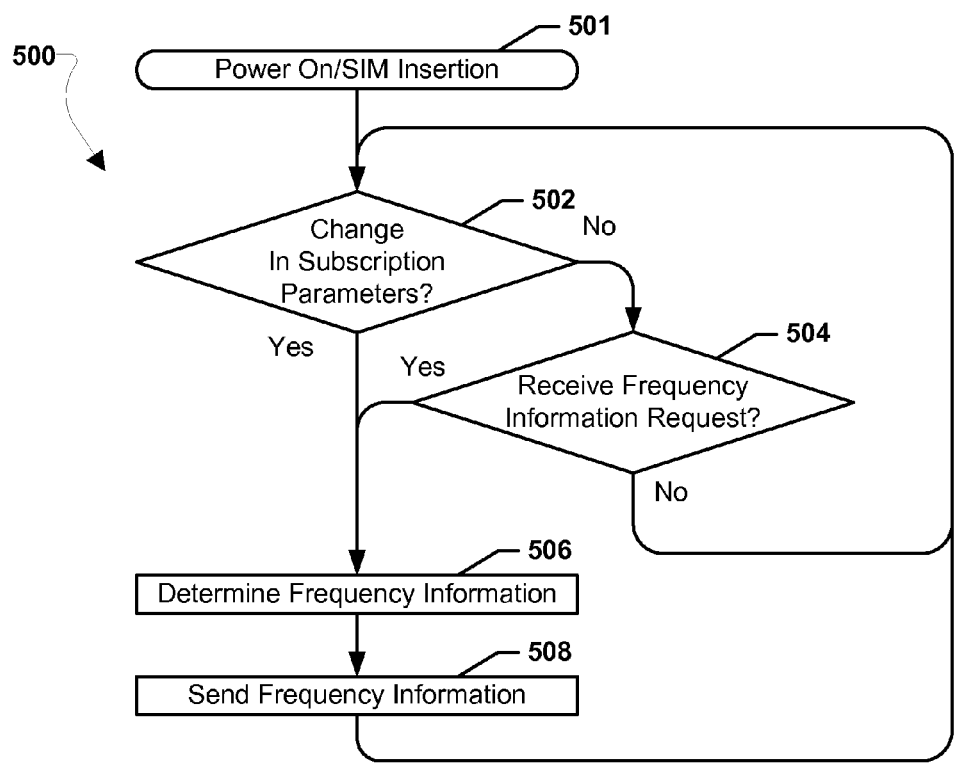
FIG. 5 is a process flow diagram illustrating a method for a subscription operating on a multi-active communication device to send frequency information for use in a device frequency information data table according to various embodiments.

FIG. 5 illustrates a method 500 for a subscription operating on a mobile communication device (e.g., a multi-active communication device) to send frequency information for use in a frequency information data table according to various embodiments. The method 500 may be implemented with a processor (e.g., the general processor 206 of FIG. 2, the baseband modem processor 216, the subscription management unit 230, a separate controller, and/or the like) of a multi-active communication device (e.g., the mobile communication devices 110, 120, 200 described with reference to FIGS. 1-3). For example, the operations of method 500 may be implemented by or within a physically or logically separate baseband processor assigned to a subscription (e.g., physically or logically separate baseband processor BB1 assigned to SIM-1 204a of FIG. 2). In some embodiments, the operations of the method 500 may be implemented in conjunction with the operations of the method 400 of FIG. 4. With reference to FIGS. 1-5, the device processor may begin performing operations of method 500 in response to the multi-active communication device's powering on and/or SIM insertion in block 501.

In determination block 502, the device processor may determine whether a change in subscription parameters has occurred. For example, the device processor may determine whether the technology type, frequency list, frequency ranges, timing indications, time between bursts, number of bursts, frequency hopping patterns, frame attributes, slot attributes, transmission durations, data rate indication, and/or any other frequency information for the subscription has changed. In response to determining the subscription parameters have not changed (i.e., determination block 502="No"), the device processor may determine whether a frequency information request has been received in determination block 504.

In response to determining that the subscription parameters have changed (i.e., determination block 502="Yes") or in response to determining that a frequency information request has been received (i.e., determination block 504="Yes"), the device processor may determine frequency information in block 506. Frequency information may include information describing the operation of the RF resources used by the subscription, such as technology type indications (e.g., WCDMA FDD, GSM/GPRS TDD, LTE FDD/TDD, TD-SCDMA TDD, CDMA 1x/DO FDD, etc.), frequency indications (e.g., frequency list, frequency ranges, etc.), timing indications (e.g., time between bursts, number of bursts, frequency hopping patterns, frame attributes, slot attributes, transmission durations, etc.), and/or data rate indications (e.g., high, low, etc.). As examples, frequency information may be determined for the subscription by polling the RF resources associated with the subscription or based on network settings provided to the multi-active communication device and stored in a memory of the multi-active communication device (e.g., memory 214 of FIG. 2).

In block 508, the device processor may send the frequency information. For example, the device processor may send the frequency information to a subscription management module (e.g., subscription management module 230 of FIG. 2).

After sending the frequency information in block 508, in response to determining that the subscription parameters have not changed (i.e., determination block 502="No") or in response to determining that a frequency information request has not been received (i.e., determination block 504="No"), the device processor may perform the operations of the method 500 in a loop by determining whether the subscription parameters have changed in block 502.

FIG. 6 illustrates a method 600 for blocking reselection of a first subscription on a mobile communication device (e.g., a multi-active communication device) to neighbor cells prone to interference by a second subscription according to various embodiments. The method 600 may be implemented with a processor (e.g., the general processor 206 of FIG. 2, the baseband modem processor 216, the subscription management unit 230, a separate controller, and/or the like) of a multi-active communication device (e.g., the mobile communication devices 110, 120, 200 described with reference to FIGS. 1-3). In some embodiments, the operations of the method 600 may be implemented in conjunction with the operations of the method 400 of FIG. 4 and/or method 500 of FIG. 5.

With reference to FIGS. 1-6, the device processor may determine whether a reselection criteria for a subscription is met in determination block 602. For example, a reselection criteria may be a serving cell quality measurement falling below a quality threshold. In response to determining that a reselection criteria is not met (i.e., determination block 602="No"), the device processor may continue to monitor the reselection criteria for the subscription in determination block 602.

In response to determining that the reselection criteria is met (i.e., determination block 602="Yes"), the device processor may perform neighbor cell measurements for each neighbor cell in the neighbor cell list of the reselecting subscription. The neighbor cell list may be provided by the network for the current serving cell for the reselecting subscription and the device processor may perform neighbor cell measurements, such as intra-frequency measurements, inter-frequency measurements, inter-RAT measurements, etc., for each listed neighbor cell to determine attributes of each cell, including a signal strength experienced with each neighbor cell.

In block 606, the device processor may sort the neighbor cell list based on the signal strength of each neighbor cell. In this manner, cells with stronger signal strength may be prioritized for reselection over weaker signal strength cells. In determination block 608, the device processor may determine whether other subscriptions are operating on the multi-active communication device. For example, the device processor may determine whether a second subscription may be active on the multi-active communication device. In response to determining that no other subscriptions are operating on the multi-active communication device (i.e., determination block 608="No"), the device processor may conduct reselection using the neighbor cell list sorted based on signal strength in block 610. Upon reselection, the device processor may return to determination block 602 to determine whether reselection criteria for the subscription are again met on the newly selected cell.

In response to determining that at least one other subscription is operating on the multi-active communication device (i.e., determination block 608="Yes"), the device processor may query the frequency information table to retrieve frequency information of the one or more other subscriptions operating on the multi-active communication device in block 612. For example, the device processor may retrieve frequency information for a second subscription operating on the multi-active communication device including the technology type, frequency indication, timing indication, and data rate. As a specific example, the frequency list and frequency hopping pattern of a second subscription may be retrieved from the frequency information table.

In block 614, the device processor may determine an interference estimate for each neighbor cell on the neighbor cell list based on the frequency information of the other one or more subscriptions operating on the multi-active communication device. For example, an interference estimate for each neighbor cell in a neighbor cell list of a WCDMA subscription may be determined based on the frequency ranges and frequency hopping pattern for a GSM subscription indicated in the frequency information data table. The interference estimates may be based on an amount of interference and a periodicity of the interference. The amount and periodicity of interference may be functions of various factors, including the frequency hopping patterns of the subscriptions. In various embodiments, the interference estimates may be low, such as zero, for neighbor cells that do not overlap frequencies with other subscriptions and higher, such as values 1-10, based on an amount of interference and a periodicity of the interference. In various embodiments, the interference estimates may be representations of an estimate of the percentage of time per frame that the reselecting subscription may experience interference from another subscription.

In block 616, the device processor may sort the neighbor cell list based on the determined interference estimate for each neighbor cell. The device processor may remove neighbor cells with determined interference estimates above a degradation threshold to generate a revised neighbor cell list in block 618. The degradation threshold may be a value representing a maximum amount of interference that may be acceptable on a reselected cell. For example, the degradation threshold may be a value corresponding to a maximum percentage of time per frame that the reselecting subscription may experience interference from another subscription above which reselection could impact service for the reselecting subscription. Removing the neighbor cells with interference estimates above the degradation threshold may block the device processor from reselecting to a cell on which the subscription may experience significant service disruptions.

In block 620, the device processor may sort the revised neighbor cell list based on the signal strength of each neighbor cell. In block 622, the device processor may conduct reselection using the revised neighbor cell list sorted based on signal strength. Upon reselection, the device processor may return to determination block 602 to determine whether reselection criteria for the subscription are again met on the newly selected cell.

FIG. 7 illustrates a method 700 for blocking reselection of a first subscription on a mobile communication device (e.g., a multi-active communication device) to neighbor cells prone to interference by a second subscription according to various embodiments. The method 700 may be implemented with a processor (e.g., the general processor 206 of FIG. 2, the baseband modem processor 216, the subscription management unit 230, a separate controller, and/or the like) of a multi-active communication device (e.g., the mobile communication devices 110, 120, 200 described with reference to FIGS. 1-3). In some embodiments, the operations of the method 700 may be implemented in conjunction with the operations of the method 400 of FIG. 4 and/or method 500 of FIG. 5.

Referring to FIGS. 1-7, in blocks 602, 660, 608, 610, 612, and 614, the device processor may perform operations of like numbered blocks of the method 600 (e.g., described with reference to FIG. 6) to determine an interference estimate for each neighbor cell on the neighbor cell list based on frequency information of other subscriptions operating on the multi-active communication device.

In block 702, the device processor may determine a priority for each neighbor cell based at least in part on the signal strength and determined interference estimate for that neighbor cell. For example, signal strength and interference may be inputs to a weighted non-linear equation used to determine a priority value.

In block 704, the device processor may sort the neighbor cell list based on the determined priority for each neighbor cell. In block 706, the device processor may conduct reselection using the neighbor cell list sorted based on the determined priority. Upon reselection, the device processor may return to determination block 602 to determine whether reselection criteria for the subscription are again met on the newly selected cell.

Figure 8:
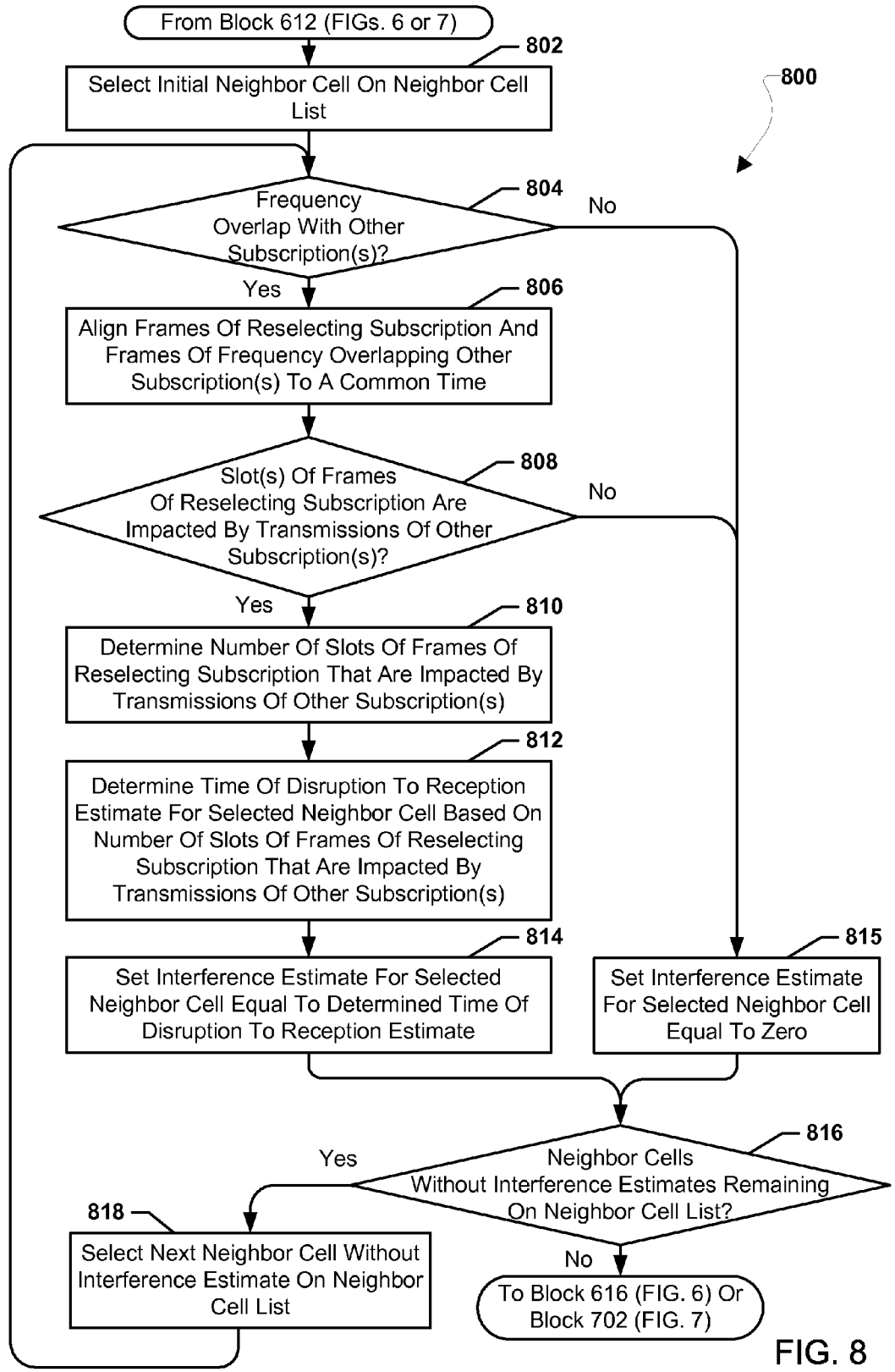
FIG. 8 is a process flow diagram illustrating a method for determining interference estimates for each neighbor cell on a neighbor cell list of a first subscription on a multi-active communication device based on frequency information of a second subscription operating on the multi-active communication device according to various embodiments.

FIG. 8 illustrates a method 800 for determining interference estimates for each neighbor cell on a neighbor cell list of a first subscription on a mobile communication device (e.g., a multi-active communication device) based on frequency information of a second subscription according to various embodiments. The method 800 may be implemented with a processor (e.g., the general processor 206 of FIG. 2, the baseband modem processor 216, the subscription management unit 230, a separate controller, and/or the like) of a multi-active communication device (e.g., the mobile communication devices 110, 120, 200 described with reference to FIGS. 1-3). In some embodiments, the operations of the method 800 may be implemented in conjunction with the operations of the method 400 of FIG. 4, method 500 of FIG. 5, method 600 of FIG. The operations of the method 800 implement some embodiments of the operations performed in block 614 of the method 600 of FIG. 6 and method 700 of FIG. 7. Thus, with reference to FIGS. 1-8, the device processor may begin performing operations of the method 800 after querying the frequency information table to retrieve frequency information of the one or more other subscriptions operating on the multi-active communication device in block 612 of the method 600 or the method 700.

In block 802, the device processor may select an initial neighbor cell on the neighbor cell list. In block 804, the device processor may determine whether there is a frequency overlap between the selected neighbor cell and the one or more other subscriptions operating on the multi-active communication device. For example, the device processor may compare the frequency of the selected neighbor cell to the frequency list of a second subscription determined from the frequency information data table to determine whether any frequencies match.

In response to determining that the selected neighbor cell overlaps a frequency of another subscription (i.e., determination block 804="Yes"), the device processor may align frames of the reselecting subscription and the frames of the one or more other subscriptions with the overlapping frequency to a common time in block 806. For example, the starting point of a frame of the reselecting subscription may be aligned with a corresponding point in the frame of a second subscription. In this manner, even though the frame length may not be the same and the frame starting times may be different, the frames may be aligned to a common time with one another. Aligning frames to a common time may enable slots of the subscriptions to be compared based on the alignment and may simplify the determination of whether one or more slots of the frames of a first subscription are impacted by transmissions of a second subscription.

In determination block 808, the device processor may determine whether one or more slots of frames of the reselecting subscription are impacted by transmissions of the one or more other subscriptions. For example, the device processor may determine whether any slot of the reselecting subscription is overlapped by a transmission of a second subscription.

In response to determining that there is no frequency overlap with other subscriptions (i.e., determination block 804="No") or in response to determining that no slots of frames of the reselecting subscription are impacted by transmissions of other subscriptions (i.e., determination block 808="No"), the device processor may set the interference estimate for the selected neighbor cell equal to zero in block 815.

In determination block 816, the device processor may determine whether there are any neighbor cells without interference estimates remaining on the neighbor cell list. In response to determining there are neighbor cells without interference estimates (i.e., determination block 816="Yes"), the device processor may select the next neighbor cell without an interference estimate on the neighbor cell list in block 818 and proceed to block 804 to determine whether there is a frequency overlap of that neighbor cell with other subscriptions operating on the multi-active communication device.

In response to determining at least one slot of a frame of the reselecting subscription are impacted by transmissions of other subscriptions (i.e., determination block 808="Yes"), the device processor may determine a number of slots of frames of the reselecting subscription that are impacted by transmissions of other subscriptions in block 810. In block 812, the device processor may determine a time of disruption to reception estimate for the selected neighbor cell based on the number of slots of frames of the reselecting subscription that are impacted by transmissions of other subscriptions. A time of disruption to reception estimate may be an estimate of any disruption to the reception on one subscription's RF resources due to transmissions on another subscription's RF resources. For example, the device processor may multiply the number of slots per frame impacted by the length of each slot to determine the time of disruption to reception estimate on per frame basis. As a specific example, a reselecting subscription's frames may each be comprised of ten one millisecond long slots and four slots may be impacted by another subscriptions transmissions resulting in a time out of service estimate of four milliseconds per frame.

In block 814, the device processor may set the interference estimate for the selected neighbor cell equal to the determined time of disruption of reception estimate. The device processor may determine whether there are any neighbor cells without interference estimates remaining on the neighbor cell list in block 816. In response to determining there are no neighbor cells without interference estimates (i.e., determination block 816="No"), the device processor may proceed to block 616 of the method 600 (FIG. 6) or block 702 of the method 700 (FIG. 7), accordingly.

Figure 9:
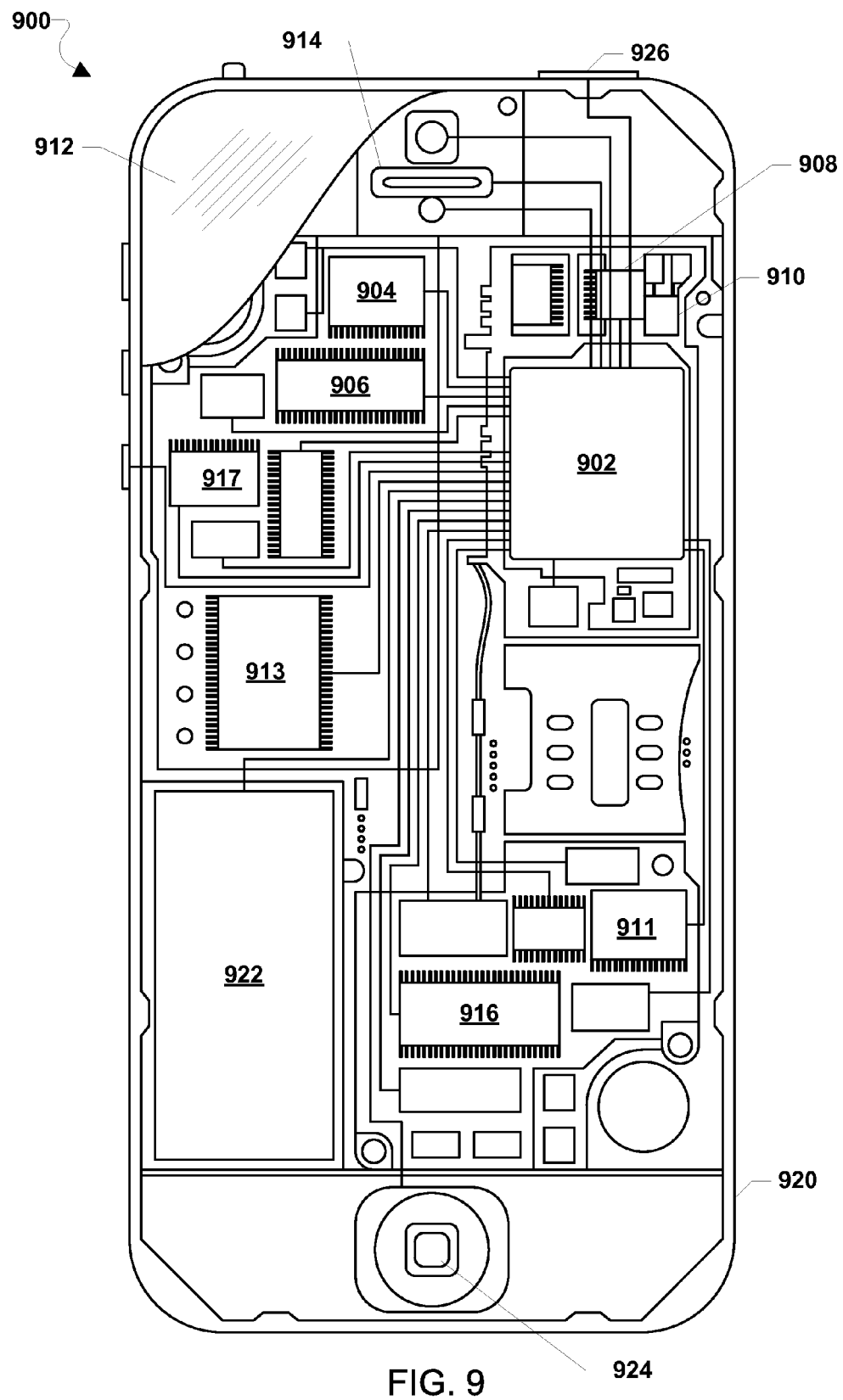
FIG. 9 is a component block diagram of a multi-active communication device suitable for implementing some embodiment methods.

Various embodiments may be implemented in any of a variety of mobile communication devices, an example on which (e.g., mobile communication device 900) is illustrated in FIG. 9. According to various embodiments, the mobile communication device 900 may be similar to the mobile communication devices 110, 120, 200 as described above with reference to FIGS. 1-3. As such, the mobile communication device 900 may implement the methods 400, 500, 600, 700, and 800 in FIGS. 4-8.

With reference to FIGS. 1-9, the mobile communication device 900 may include a processor 902 coupled to a touchscreen controller 904 and an internal memory 906. The processor 902 may be one or more multi-core integrated circuits designated for general or specific processing tasks. The internal memory 906 may be volatile or non-volatile memory, and may be secure and/or encrypted memory, or unsecure and/or unencrypted memory, or any combination thereof. The touchscreen controller 904 and the processor 902 may also be coupled to a touchscreen panel 912, such as a resistive-sensing touchscreen, capacitive-sensing touchscreen, infrared sensing touchscreen, etc. Additionally, the display of the mobile communication device 900 need not have touch screen capability.

The mobile communication device 900 may have one or more cellular network transceivers 908, 916 coupled to the processor 902 and to two or more antennae 910, 911 and configured for sending and receiving cellular communications. The transceivers 908, 916 and the antennae 910, 911 may be used with the above-mentioned circuitry to implement the various embodiment methods. The mobile communication device 900 may include one or more SIM cards (e.g., SIM 913) coupled to the transceivers 908, 916 and/or the processor 902 and configured as described above. The mobile communication device 900 may include a cellular network wireless modem chip 917 that enables communication via a cellular network and is coupled to the processor 902.

The mobile communication device 900 may also include speakers 914 for providing audio outputs. The mobile communication device 900 may also include a housing 920, constructed of a plastic, metal, or a combination of materials, for containing all or some of the components discussed herein. The mobile communication device 900 may include a power source 922 coupled to the processor 902, such as a disposable or rechargeable battery. The rechargeable battery may also be coupled to the peripheral device connection port to receive a charging current from a source external to the mobile communication device 900. The mobile communication device 900 may also include a physical button 924 for receiving user inputs. The mobile communication device 900 may also include a power button 926 for turning the mobile communication device 900 on and off.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to some embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method implemented on a multi-active communication device for reducing interference between subscriptions during cell reselection, comprising:
   receiving frequency information from each subscription operating on the multi-active communication device; and
   generating a frequency information data table stored in a memory of the multi-active communication device based on the received frequency information from each subscription;
   performing neighbor cell measurements for each neighbor cell in a neighbor cell list of a first subscription in response to meeting a reselection criteria for the first subscription;
   determining whether a second subscription is operating on the multi-active communication device;
   querying the frequency information data table stored in the memory of the multi-active communication device to retrieve frequency information of the second subscription in response to determining that the second subscription is operating on the multi-active communication device; and
   determining an interference estimate for each neighbor cell on the neighbor cell list based on the frequency information of the second subscription.

2. The method of claim 1, further comprising sorting the neighbor cell list based on the interference estimate for each neighbor cell.

3. The method of claim 2, further comprising:
   removing neighbor cells with interference estimates above a degradation threshold to generate a revised neighbor cell list;
   sorting the revised neighbor cell list based on a signal strength of each neighbor cell; and
   conducting reselection for the first subscription using the revised neighbor cell list sorted based on the signal strength of each neighbor cell.

4. The method of claim 3, wherein the degradation threshold is a maximum interference time per frame for the first subscription.

5. The method of claim 1, further comprising:
   sorting the neighbor cell list based on the interference estimate for each neighbor cell and a signal strength of each neighbor cell; and
   conducting reselection for the first subscription based on the sorting.

6. The method of claim 1, further comprising:
   determining a priority for each neighbor cell on the neighbor cell list;
   sorting the neighbor cell list based on the determined priority for each neighbor cell; and
   conducting reselection for the first subscription using the neighbor cell list sorted based on the determined priority for each neighbor cell.

7. The method of claim 6, wherein the determined priority is based at least in part on the signal strength of and the interference estimate for that neighbor cell.

8. The method of claim 1, wherein determining an interference estimate for each neighbor cell on the neighbor cell list based on the frequency information of the second subscription comprises:
   determining whether a frequency of a selected neighbor cell overlaps a frequency of the second subscription based on the frequency information of the second subscription;
   aligning frames of the first subscription and frames of the second subscription to a common time in response to determining that the frequency of the selected neighbor cell overlaps a frequency of the second subscription;
   determining whether one or more slots of the frames of the first subscription are impacted by transmissions of the second subscription based on an alignment of the frames of the first subscription and the frames of the second subscription to the common time;
   determining a time of disruption of reception estimate for the selected neighbor cell based on a number of slots of the frames of the first subscription impacted by transmissions of the second subscription in response to determining that one or more slots of the frames of the first subscription are impacted by transmissions of the second subscription;
   setting the interference estimate for the selected neighbor cell to the determined time of disruption of reception estimate in response to determining that one or more slots of the frames of the first subscription are impacted by transmissions of the second subscription; and
   setting the interference estimate for the selected neighbor cell to zero in response to determining that the frequency of the selected neighbor cell does not overlap a frequency of the second subscription or in response to determining that no slots of the frames of the first subscription are impacted by transmissions of the second subscription.

9. The method of claim 1, wherein the frequency information is one or more of a technology type indication, frequency indication, timing indication, and data rate indication.

10. The method of claim 9, wherein each subscription operating on the multi-active communication device is configured to send the subscription's frequency information in response to a change in subscription parameters or a request for frequency information.

11. The method of claim 1, further comprising sorting the neighbor cell list based on a signal strength of each neighbor cell.

12. The method of claim 11, further comprising conducting reselection for the first subscription using the neighbor cell list sorted based on the signal strength of each neighbor cell in response to determining that a second subscription is not operating on the multi-active communication device.

13. The method of claim 1, further comprising determining whether the reselection criteria have been met for the first subscription.

14. The method of claim 13, wherein the reselection criteria is a serving cell quality measurement falling below a quality threshold.

15. A multi-active communication device, comprising:
a first radio frequency (RF) resource;
a second RF resource;
a memory; and
a processor coupled to the first and second RF resources and the memory and configured with processor-executable instructions to:
  receive frequency information from each subscription operating on the multi-active communication device; and
  generate a frequency information data table stored in the memory based on the received frequency information from each subscription;
  perform neighbor cell measurements for each neighbor cell in a neighbor cell list of a first subscription in response to meeting a reselection criteria for the first subscription;
  determine whether a second subscription is operating on the multi-active communication device;
  query the frequency information data table stored in the memory to retrieve frequency information of the second subscription in response to determining that the second subscription is operating on the multi-active communication device; and
  determine an interference estimate for each neighbor cell on the neighbor cell list based on the frequency information of the second subscription.

16. The multi-active communication device of claim 15, wherein the processor is further configured with processor-executable instructions to sort the neighbor cell list based on the interference estimate for each neighbor cell.

17. The multi-active communication device of claim 16, wherein the processor is further configured with processor-executable instructions to:
  remove neighbor cells with interference estimates above a degradation threshold to generate a revised neighbor cell list;
  sort the revised neighbor cell list based on a signal strength of each neighbor cell; and
  conduct reselection for the first subscription using the revised neighbor cell list sorted based on the signal strength of each neighbor cell.

18. The multi-active communication device of claim 17, wherein the degradation threshold is a maximum interference time per frame for the first subscription.

19. The multi-active communication device of claim 15, wherein the processor is further configured with processor-executable instructions to:
  determine a priority for each neighbor cell on the neighbor cell list;
  sort the neighbor cell list based on the determined priority for each neighbor cell; and
  conduct reselection for the first subscription using the neighbor cell list sorted based on the determined priority for each neighbor cell.

20. The multi-active communication device of claim 19, wherein the determined priority is based at least in part on the signal strength of and the interference estimate for that neighbor cell.

21. The multi-active communication device of claim 15, wherein the processor is further configured with processor-executable instructions to determine an interference estimate for each neighbor cell on the neighbor cell list based on the frequency information of the second subscription by:
  determining whether a frequency of a selected neighbor cell overlaps a frequency of the second subscription based on the frequency information of the second subscription;
  aligning frames of the first subscription and frames of the second subscription to a common time in response to determining that the frequency of the selected neighbor cell overlaps a frequency of the second subscription;
  determining whether one or more slots of the frames of the first subscription are impacted by transmissions of the second subscription based on an alignment of the frames of the first subscription and the frames of the second subscription to the common time;
  determining a time of disruption of reception estimate for the selected neighbor cell based on a number of slots of the frames of the first subscription impacted by transmissions of the second subscription in response to determining that one or more slots of the frames of the first subscription are impacted by transmissions of the second subscription;
  setting the interference estimate for the selected neighbor cell to the determined time of disruption of reception estimate in response to determining that one or more slots of the frames of the first subscription are impacted by transmissions of the second subscription; and
  setting the interference estimate for the selected neighbor cell to zero in response to determining that the frequency of the selected neighbor cell does not overlap a frequency of the second subscription or in response to determining that no slots of the frames of the first subscription are impacted by transmissions of the second subscription.

22. The multi-active communication device of claim 15, wherein the frequency information is one or more of a technology type indication, frequency indication, timing indication, and data rate indication.

23. The multi-active communication device of claim 22, wherein each subscription operating on the multi-active communication device is configured to send the subscription's frequency information in response to a change in subscription parameters or a request for frequency information.

24. The multi-active communication device of claim 15, wherein the processor is further configured with processor-executable instructions to sort the neighbor cell list based on a signal strength of each neighbor cell.

25. The multi-active communication device of claim 15, wherein the processor is further configured with processor-executable instructions to conduct reselection for the first subscription using the neighbor cell list sorted based on the signal strength of each neighbor cell in response to determining that a second subscription is not operating on the multi-active communication device.

26. The multi-active communication device of claim 15, wherein the processor is further configured with processor-executable instructions to determine whether the reselection criteria have been met for the first subscription.

27. A non-transitory processor-readable storage medium having stored thereon processor-executable instructions configured to cause a processor of a multi-active communication device to perform operations for reducing interference between subscriptions during cell reselection comprising:

receiving frequency information from each subscription operating on the multi-active communication device; and generating a frequency information data table stored in a memory of the multi-active communication device based on the received frequency information from each subscription;

performing neighbor cell measurements for each neighbor cell in a neighbor cell list of a first subscription in response to meeting a reselection criteria for the first subscription;

determining whether a second subscription is operating on the multi-active communication device;

querying the frequency information data table stored in the memory of the multi-active communication device to retrieve frequency information of the second subscription in response to determining that the second subscription is operating on the multi-active communication device; and determining an interference estimate for each neighbor cell on the neighbor cell list based on the frequency information of the second subscription.

28. A multi-active communication device, comprising:

means for receiving frequency information from each subscription operating on the multi-active communication device; and means for generating a frequency information data table stored in a memory of the multi-active communication device based on the received frequency information from each subscription;

means for performing neighbor cell measurements for each neighbor cell in a neighbor cell list of a first subscription in response to meeting a reselection criteria for the first subscription;

means for determining whether a second subscription is operating on the multi-active communication device;

means for querying the frequency information data table stored in the memory of the multi-active communication device to retrieve frequency information of the second subscription in response to determining that the second subscription is operating on the multi-active communication device; and means for determining an interference estimate for each neighbor cell on the neighbor cell list based on the frequency information of the second subscription.

* * * * *